United States Patent Office 3,689,298
Patented Sept. 5, 1972

3,689,298
METHOD OF INCORPORATING FILLERS IN CATIONIC BITUMINOUS EMULSIONS AND PRODUCTS PRODUCED THEREBY
Jack N. Dybalski, Chicago, and Robert D. Timmons, Tinley Park, Ill., assignors to Armour Industrial Chemical Company (a wholly owned subsidiary of Akzona Incorporated), Chicago, Ill.
No Drawing. Continuation-in-part of application Ser. No. 540,811, Apr. 7, 1966, which is a continuation-in-part of application Ser. No. 393,745, Sept. 1, 1964. This application Apr. 29, 1968, Ser. No. 725,201
Int. Cl. C08h 13/00, 17/22; C08j 1/46
U.S. Cl. 106—280
13 Claims

ABSTRACT OF THE DISCLOSURE

The method of preparing storage stable dispersions of fillers in aqueous cationic bituminous emulsions comprising pretreating finely divided filler material with an aqueous solution of a polyvalent metal salt and thereafter mixing the treated filler material with a cationic bituminous emulsion to obtain a dispersion of finely divided filler in the aqueous cationic bituminous emulsion, and dispersions produced by such a method. The storage stable dispersions obtained are useful as floor tile adhesives, roofing compositions, sound deadeners, protective coatings, insulating compositions and the like.

CROSS-REFERENCE TO RELATED APPLICATIONS

This application is a continuation-in-part of our copending application Ser. No. 540,811, filed Apr. 7, 1966, now abandoned, which is a continuation-in-part of our application Ser. No. 393,745, filed Sept. 1, 1964, now abandoned.

Aqueous emulsions of bituminous materials are well known in the art. Such emulsions may be formulated using anionic or cationic emulsifiers. Emulsions formulated using anionic emulsifiers "break" when the water content falls below a certain level, as will occur due to evaporation and absorption of water by aggregate materials. Thus, the setting or depositing of such emulsions may require a considerable time and will tend to be rather variable. Various agents have been found useful to induce "breaking" of the anionic bituminous emulsion to hasten the depositing of bitumen from such systems. In contrast, the bituminous emulsions formulated using cationic emulsifiers do not "break" in the same manner as anionic emulsions, but rather the bituminous material is deposited from the emulsion due to the attraction of polar charges between the droplets and negatively charged surfaces. Therefore, it is seen that anionic and cationic aqueous bituminous emulsions are entirely different in their mode of action.

Cationic bituminous emulsions have achieved considerable acceptance in road building applications. The aqueous cationic bituminous emulsions themselves are relatively stable, and the emulsion stability may be enhanced by various additives well known in the art. The cationic bituminous emulsions, however, deposit on the surface of aggregate materials rapidly upon such materials being mixed with the emulsions. Asphalt from an aqueous cationic asphalt emulsion is deposited from the emulsion due to the charge attraction between the asphalt droplets and the aggregate materials. The rapid setting action of cationic bituminous emulsions is of considerable advantage in road building, such as seal coats, since the roads can be opened to traffic shortly after application of the asphalt. Although the rate of asphalt deposition from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion-aggregate mix to be rapidly spread. It can be readily recognized that due to the charge attraction mechanism, the rapidity of deposition of bituminous materials from the cationic emulsion is directly related to the generally negatively charged surface area of the aggregate or filler material. Thus, while a specific cationic asphalt emulsion might provide suitable properties for use in conjunction with aggregates, the same cationic emulsion may not exhibit suitable properties when used with very finely ground materials having vastly larger surface areas.

Since cationic bituminous emulsions have highly desirable water proofing and adhesive properties, it would be desirable to employ such emulsions as floor tile setting cements, roofing compositions, sound deadener compositions, insulating compositions and the like. Such applications, however, require the incorporation of finely-divided fillers in order to provide other desired properties such as firmness or mechanical strength when set, sound-proofing and insulation. If the filler compositions could be prepared at the point of use, and applied immediately after application, the incorporation of fillers would not be as serious a problem as it is. However, formulation at the site of use is not usually practical, and it is therefore desirable to prepare the complete filled composition at a central plant where the products are package and distributed through the channels of commerce to the ultimate users. It is, therefore, necessary to provide a method of preparing storage stable dispersions of fillers in aqueous cationic bituminous emulsions, which may be stored for more than six months or a year.

The major problem in preparing storage stable dispersions of finely-divided filler material in cationic bituminous emulsions is the prevention of coating the filler material with bitumen upon contact of the filler material with the cationic bituminous emulsion. When the bitumen coats the filler material, agglomerates of the finely-divided filler material are obtained and stable dispersions are not obtained. Most desired filler materials are finely-divided and thus present a large negatively charged surface area. Upon addition of such filler material to cationic bituminous emulsions, untreated filler becomes coated with bitumen in a very short period of time, forming agglomerates, and thus forming unstable emulsions in that the bitumen is removed from the emulsion and deposited on the filler material.

It is therefore the principal object of the present invention to provide a method of substantially overcoming the problems and difficulties described above. More specifically, it is an object of this invention to provide a method of preparing storage stable dispersions of negatively-charged fillers in aqueous cationic bituminous emulsions. Further objects and advantages will be indicated in the following detailed specification.

The process of this invention may be used with a wide variety of finely-divided fillers. The external surfaces of most common filler materials may be regarded as negatively-charged, since they have a preponderance of negatively-charged sites, and the average or net surface charge is therefore negative. The negative surface charge on finely divided materials, such as those commonly applied as inert fillers, is independent of the acidic or basic character of the material. For example, silica dust is an acidic mineral while ordinary limestone ($CaCO_3$) is a basic mineral, yet both limestone powder and silica dust comprise fillers with negatively-charged surfaces. Consequently, practically all mineral fillers including asbestos, slate flour, talc, silica dust, limestone powder, mica, and the like are suitable for use in the present invention. Many organic or vegetable fillers are also within the broad scope of the present invention. For example, materials such as ground cork, rubber crumbles, and the like may be used for their insulating or sound proofing properties, and lend themselves to processing by the method of the present invention. Cellulosic fillers, such as wood flour, or organic fillers such as pigments, coal dust, synthetic fillers and the like may also sometimes be employed, depending on the particular end use of the storage stable dispersions.

It will be noted from the above description of suitable fillers that the finely ground particles of filler are extremely small. Suitable particle sizes for fillers are well known in the art to be such that the greatest proportion of material will pass through a #200 sieve. Mineral dust is known as that material which does pass through a #200 sieve. Mineral fillers are recognized under ASTM Designation 546 as having the following mineral gradation requirements:

| Sieve size: | Percent passing by dry weight |
|---|---|
| 30 | 100 |
| 100 | 90 |
| 200 | 65 |

Such definitions and specifications have been set forth by The Asphalt Institute, and are clearly set forth in the manual "Introduction to Asphalt," Manual Series No. 5 (MS–5), Fourth Edition, November 1962. Thus, it is seen that the filler materials of this invention are of an entirely different character than coarse aggregates, which are retained on a #8 sieve, and even appreciably smaller than fine aggregate, which is recognized as material passing through a #8 sieve. Filler materials as coarse as retained on No. 20–50 sieve or coarser are obviously not suitable to form the dispersions of our invention since they would not be maintained in a dispersed state over long periods of time.

Thus, with respect to filler materials having discrete particles suitable for use in our invention, such as mineral fillers, it is seen that 100 percent of the particles must pass a size 30 sieve while at least 90 percent of the particles must pass a size 100 sieve. Therefore, the mineral fillers can be described as those of a particle size that at least 90 percent will pass a #100 sieve.

Also within the definition of finely divided fillers as called for by our process, we include very finely divided asbestos fibers known in the industry as "floats." "Floats" are fibers so fine and light that they are collected by air flotation. They are precipitated into float chambers by gravity, settling or collected by other filtering media. While asbestos floats are very small in size, presenting large surface areas, they can not be designated with respect to passing through specified size sieves due to their irregular shapes.

For preparing products such as roofing compositions, tile setting cements, and crack sealers, mineral fillers will ordinarily be employed, particularly siliceous mineral fillers, such as asbestos or slate flour. Such mineral fillers are very cheap and perform the desired function of imparting body or mechanical strength to the compositions. Where it is desired to employ the product as a sound deadener coating, powdered limestone may be used as the filler. Another advantageous filler for this purpose is "rubber crumbles" which is a scrap material obtained as part of tire re-capping operations. It is vulcanized rubber in the form of small particles.

The present invention contemplates a pre-treatment procedure wherein the finely-divided filler material of the kind described is contacted with an aqueous solution of a treating agent which advantageously alters the surface charge of the filler material. In achieveing the desired result, it has been found that the selection of the treating agent is of importance, and that the treating agent should be employed at a particular concentration in relation to the filler. More specifically, this invention contemplates the use of two classes of treating agents, which may be employed in combination, although in certain applications most of the benefits of the present invention can be achieved by the separate use of the treating agents.

For many applications, the preferred treating agent is a polyvalent metal salt. Since it is desired to apply the treating agent in aqueous solution, the polyvalent metal salt should be water-soluble, and it is preferably stable or non-reactive. Water-soluble salts of iron, chromium, aluminum, and calcium are particularly desirable, although salts of other divalent or trivalent metals can be used. The chloride or other halide salts of trivalent metals like aluminum, iron, and chromium are especially desirable. The sulfate or other water-soluble salts can also be used, although they are less desirable because of their greater cost. Examples of specific salts useful in practicing this invention are: aluminum sulfate, ferric chloride, chromic chloride, aluminum chloride, magnesium chloride, zinc chloride, zinc sulfate, and calcium chloride.

In order to obtain storage stable dispersions it will usually be desirable to employ the polyvalent metal salt in an amount within the range from 0.5 to 20 parts by weight per hundred parts of the filler. In many applications, the preferred quantity will range from 5 to 15 parts per hundred parts of filler. The concentration of the filler may vary over a considerable range depending on the particular application of the product. For example, the products may contain from about 5 to 70 percent of the filler based on the total weight of the final product. For applications such as roofing compositions, tile setting cements and crack sealers, filler will usually be incorporated in an amount ranging from 5 to 20 percent of the final product, while in other applications such as in the preparation of sound deadeners, the filler may comprise from about 50 to 70 weight percent of the product.

Quaternary ammonium compounds may be employed as an alternative or additional agent for pre-treatment of the filler. Water-soluble quaternary ammonium compounds containing at least one quaternary ammonium group and an aliphatic hydrocarbon group of from 8 to 22 carbon atoms are generally suitable. From the standpoint of availability and performance, the quaternary ammonium compounds containing aliphatic hydrocarbon groups of from 12 to 18 carbons are preferred. Similarly, the mono-quaternaries are preferred, although poly-quaternaries, such as the diquaternaries can also be used. The aliphatic polyethoxylated mono- and di-quaternaries are also suitable. Such quaternaries may contain up to 10 moles of ethylene oxide groups per mole of quaternary, but they will usually contain from one to five moles.

The following quaternary compounds are illustrations of those usable in the present invention:

(1) The alkyl and alkyl polyalkoxylated quaternary ammonium compounds represented by the formula

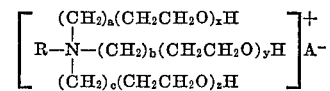

wherein R is an aliphatic hydrocarbon containing from 12 to 22 carbons, $a$, $b$, and $c$ are integers of from 1 to 2 when the corresponding $x$, $y$, or $z$ is 0, $x$, $y$, and $z$ are integers of from 1 to 4 when the corresponding $a$, $b$, or $c$ is 0, with the total of $x$, $y$, and $z$ not exceeding 10, or preferably 5, and A is an anion, such as $SO_4^-$, $NO_3^-$, $Cl^-$, $Br^-$, or $OH^-$, the valency of the anion being equal to the number of cationic quaternary groups.

(2) The alkyl and alkyl polyalkoxylated diquaternary ammonium compounds illustrated by the general formula

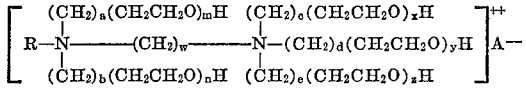

wherein R is an aliphatic hydrocarbon containing from 12 to 22 carbons, $a$, $b$, $c$, $d$, and $e$ are integers of from 1 to 2 when the corresponding $m$, $n$, $x$, $y$, or $z$ is 0, $w$ is an integer of from 2 to 4, $m$, $n$, $x$, $y$, and $z$ are integers of from 1 to 5 when the corresponding $a$, $b$, $c$, $d$, or $e$ is 0, with the total of m, n, x, y, and z not exceeding 15, and preferably 8, and A is one or more anions such as $SO_4^-$, $NO_3^-$, $Cl^-$, $Br^-$, or $OH^-$, the number of anions providing valences equal to the quaternary cations.

The quaternary treating agent may be employed in an amount ranging from .05 to 1.0 part by weight of the quaternary per hundred parts of the filler. In many applications, the preferred range will be from 0.1 to 0.3 part of the quaternary per part of the filler. It will be understood that the quaternary cations are the effective portions of the treating agents.

The aqueous solution of the pre-treating agent, containing either the polyvalent metal salt, the quaternary ammonium compound, or both, is brought into intimate contact with the finely-divided filler material. While the concentration of the aqueous solution is not particularly critical, enough of the aqueous carrier should be employed to thoroughly wet the external surfaces of the filler particles. On the other hand, it is not desirable to employ excess water, since excess water may make it more difficult to achieve the desired formulation of the final product, unless some of the water is removed prior to combination with the bituminous emulsion. This consideration applies particularly to highly filled products such as sound deadeners, where the diluting effect of the water is particularly inconvenient. By way of illustration, a five to ten percent solution of the polyvalent metal salt can be used, and mixed with the filler material until the material is wetted. No special mixing equipment is required, the usual blending or mixing equipment being suitable. Usually, the quantity of aqueous solution employed will be less than that required to form a slurry. As indicated, the important consideration is that the external surfaces of the filler material is wetted with the treating agent.

In the next step of the method, the wetted filler material is mixed with the cationic bituminous emulsion. As previously indicated, the proportions and specific formulation will depend on the end use. The cationic bituminous emulsions which are suitable are those which are characterized by having a continuous aqueous phase, a dispersed bituminous phase, and a cationic emulsifier for the bituminous phase. The dispersed "bitumen" or "bituminous phase," may be asphalt or other similar bituminous or resinous material, such as the plastic residues from coal, coal tar distillation, petroleum pitch, petroleum resins, coumarone-indene resins, plastic-modified petroleum resins, and the like. The bitumen will ordinarily be employed in a concentration within the range from 20 to 80 percent by weight of the emulsion, while the more usual concentration will range from about 50 to 70 weight percent.

In general, those cationic emulsifiers can be used which have been found to be effective for forming oil-in-water bituminous emulsions. These include N-alkyl polymethylene and N-alkyl polymethylene mono- and polyethoxylated diamines, the amido amines, heterocyclic amines and the alkyl and alkyl polyethoxylated quaternary and diquaternary ammonium compounds. Such cationic emulsifiers and the procedure for forming oil-in-water bituminous emulsions therewith are well known in the art. Various modifiers and stabilizers may also be incorporated in the emulsions.

We have found that incorporation of the treating agent in the aqueous cationic bituminous emulsion and then addition of the filler material to the emulsion does not give satisfactory results. For example, when quaternary ammonium compounds, which are known in the art to be suitable aqueous bituminous emulsifiers, are used as emulsifiers for an aqueous cationic bituminous emulsion system, addition of finely divided filler material to the emulsion, especially in amounts more than 50 weight percent does not result in storage stable dispersions of the filler material in the cationic bituminous emulsion system. On the contrary, much of the filler material almost immediately becomes coated with bitumen and agglomeration results. Therefore, the pre-treatment step of our invention is necessary to provide suitable commercial products of dispersions of finely divided fillers in aqueous cationic bituminous emulsions. Especially as the desired quantity of filler increases, such as from about 50 to 70 weight percent filler, as is desired for automobile undercoatings, we have found the pre-treatment step to be necessary.

In certain preferred embodiments, the same cationic emulsifier is used for forming the bituminous emulsion as in the pre-treatment of the filler. For example, the emulsifier can be a quaternary of or diquaternary compound as set out above in Formulas 1 and 2. The bituminous emulsion before combination with the filler may contain from 0.1 to 2% by weight of the quaternary emulsifiers, and preferably from 0.3 to 1% by weight.

This invention is further illustrated in the following specific examples.

Example I

A floor-tile adhesive was prepared by treating 9.5 parts by weight of finely-divided asbestos fibers (asbestos floats obtained from Johns-Manville Company under the designation 7TF1—100% passing 10 mesh screens on Quebec Standard Asbestos Testing Machine, the Canadian Chrysotile Asbestos Classification adopted by the Quebec Asbestos Miners Association) with 10.5 parts by weight of a ten percent solution of aluminum chloride. The solution was mixed with the asbestos until the particles were thoroughly wetted with the solution. The wetted asbestos was then mixed with 80 parts by weight of an aqueous cationic bituminous emulsion. The emulsion contained 65 percent asphalt as the dispersed phase and 35 percent water as the continuous phase. The emulsifying agent was a diquaternary (N-tallow, N,N-dimethyl-N′,N′,N′-trimethyl 1,3-propane diammonium chloride), which was employed at a concentration of 0.75 percent based on the asphalt and water. Calcium chloride in the amount of 0.1 percent was included in the emulsion prior to being combined with the wetted asbestos.

Example II

A floor tile adhesive was prepared following the procedure of Example I and utilizing the same proportions, except that a different aqueous cationic emulsion was used. This emulsion contained 65 percent asphalt, 35 percent water, 0.5 percent tallow 1,3-propylene diamine, 0.3 percent concentrated hydrochloric acid, and 0.1 percent calcium chloride.

Example III

A sound deadener composition was prepared by pretreating finely ground (minus 200 mesh) limestone with an aqueous solution of aluminum chloride. In the specific procedure employed, 45 parts by weight of the limestone were treated with 11.5 parts by weight of a 10 percent solution of the aluminum chloride. The solution and limestone were thoroughly mixed, and this pre-blend was dispersed into 28.1 parts by weight of an aqueous cationic emulsion. The emulsion contained 65 percent asphalt, 35 percent water, 2.0 percent tallow trimethyl ammonium chloride, 1.0 concentrated hydrochloric acid, and 0.1 percent calcium chloride.

Example IV

Nine and one-half parts by weight of asbestos and 4.1 parts by weight of slate flour (100% passing 200 mesh) were thoroughly mixed with 16.4 parts by weight of a 10 percent aqueous solution of the aluminum chloride. The wetted asbestos and slate flour were then mixed with 70 parts by weight of the emulsion described in Example I. The resulting preparation is useful as a roofing composition.

Example V

A high solids sound deadener composition can be produced by blending 65 parts by weight of powdered limestone (100% passing 200 mesh) with 10 parts of a 10% by weight aqueous solution of a diquaternary compound (N-tallow, N,N-dimethyl N',N',N'-trimethyl 1,3-propane diammonium chloride). A 64 percent solids aqueous asphalt emulsion containing 2 percent of tallow trimethyl ammonium chloride as the emulsifier is mixed with the pre-treated limestone. 25 parts by weight of the emulsion are employed per 75 parts of the wetted limestone. Thereafter, another 15 parts by weight of untreated powdered limestone is blended to produce the final formulation.

Example VI

A sound deadener preparation may be prepared following the procedure of Example V, except that the quantity of the diquaternary in the pre-blend solution is reduced and aluminum chloride is added. For example, the aqueous solution may contain one part by weight of the diquaternary, together with 5 parts by weight of the aluminum chloride, per 60 parts of the powdered limestone (100% passing 200 mesh).

Example VII

An alternate procedure for treating powdered limestone (100% passing 200 mesh) for the use described in Example III is as follows: The treating solution is a 60 percent by weight aqueous solution of calcium chloride containing one part by weight of the diquaternary compound per 25 parts by weight of the calcium chloride. The diquaternary may be the one identified in Example V. This solution is used to treat the powdered limestone at the rate of 25 of the calcium chloride and one part of the diquaternary per 75 parts of the limestone. The limestone wetted with this solution is then ready for incorporation in the cationic asphalt emulsion.

Example VIII

Asbestos fibers (asbestos floats—Johns-Manville Company, 7TF1) can be pre-treated with 20 percent aqueous solutions of aluminum sulfate, chromic chloride, ferric chloride, calcium chloride or aluminum hydroxide as an alternative to the procedure described in Example I. The wetted asbestos is then ready for incorporation in the cationic bituminous emulsion, such as the asphalt emulsion described in Example I.

Example IX

A floor tile adhesive was prepared by treating asbestos floats (Johns-Manville Company, 7TF1) with a 10 percent aqueous solution of aluminum chloride in the proportions of 10.5 parts by weight of the solution per 9.5 parts of the asbestos. The resulting mix is then combined with an aqueous cationic resin emulsion. The resin may be a natural or synthetic petroleum resin, or a coumarone-indene resin. Piccopale is an example of a synthetic petroleum resin sold by Pennsylvania Industrial Chemical Corp. Suitable coumarone-indene resins include Coumar (Barrett Division of Allied Chemical & Dye), and Navillas (Neville Chemical Co.).

The emulsion may be formulated as follows:

FORMULATION A

| Ingredient: | Wt. percent |
|---|---|
| Resin | 65 |
| Water | 35 |
| Diquaternary | 0.75 |
| Calcium chloride | 0.1 |
| Hydroxyethylcellulose | 0.1 |

FORMULATION B

| Resin | 65 |
|---|---|
| Water | 35 |
| Diamine | 0.5 |
| Hydrochloric acid | 0.3 |
| Calcium chloride | 0.1 |

In Formulation A, the diquaternary is N-tallow, N,N'-dimethyl N', N', N'-trimethyl 1,3-propane diammonium chloride.

The diamines emulsifier of Formulation B is tallow 1,3-propylene diamine. Eighty parts by weight of the emulsion of Formulation A or B are combined with 20 parts by weight of the mixture of the asbestos floats and the aqueous aluminum chloride solution to form the complete floor tile adhesive. In Formulation A, the adhesive will have a set time of 30 to 40 minutes, while Formulation B will give a set time of 10–20 minutes.

Example X

A sound deadener composition is prepared by thoroughly mixing 45 parts by weight of finely ground limestone (100% passing 200 mesh) with 11.5 parts by weight of a 10 percent aqueous solution of aluminum chloride. Also incorporated in the mix is 5 parts by weight of finely ground asbestos floats (Johns-Manville Company, 7TF1). The petroleum resins are the coumarone-indene resins described in Example IX. The formulation of the emulsion is as follows:

| Ingredient: | Wt. percent |
|---|---|
| Resin | 65 |
| Water | 35 |
| Diquaternary | 1.0 |
| Hydrochloric acid | 1.0 |
| Calcium chloride | 0.1 |
| Hydroxyethylcellulose | 0.1 |

The quaternary in the above formulation is tallow trimethyl ammonium chloride. A mix of asbestos, limestone, and the aqueous solution of aluminum chloride is combined with the emulsion in the proportions of 61.5 parts by weight of the mix per 38.5 parts of the emulsion to produce the complete sound deadener.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. The method of preparing storage dispersions, remaining stable for at least six months, of negatively-charged fillers in aqueous cationic asphalt emulsions by preventing adhesion of asphalt to the filler materials, comprising wetting the external negatively-charged surfaces of finely-divided filler material selected from the group consisting of asbestos, slate flour, talc, silica dust, limestone powder, mica, ground cork, rubber crumbles, wood flour, and coal dust of which at least 90 percent of the particles of each of the members of each group pass a #100 sieve and asbestos floats and intimately combining therewith, by mixing, an aqueous solution of an inorganic polyvalent metal salt selected from the chloride, and sulfate salts of iron, chromium, aluminum, calcium, magnesium and zinc, from 0.5 to 20 parts by weight of said salt being employed per 100 parts of said filler, and thereafter mixing the wetted filler material with a cationic asphalt emulsion having a continuous aqueous phase, a dispersed asphalt phase of 20 to 80 weight percent of said emulsion, and as a cationic emulsifier for the asphalt phase N-tallow, N,N - dimethyl-N',N',N'-trimethyl 1,3-propane diammonium dichloride, said filler comprising from about 5 to 70 weight percent of the final composition, thereby obtaining a composition of dispersed filler material in an aqueous cationic asphalt emulsion which is storage stable.

2. The dispersions produced by the method of claim 1.

3. The method of claim 1 wherein the polyvalent metal salt is employed in an amount of from 5 to 15 parts by weight of said metal salt per 100 parts of the filler.

4. The method of claim 1 wherein the metal salt is a trivalent metal salt.

5. The method of claim 4 wherein the trivalent metal salt is selected from aluminum chloride, aluminum sulfate, ferric chloride, and chromic chloride.

6. The method of claim 1 wherein the metal salt is a divalent metal salt.

7. The method of claim 6 wherein the divalent metal salt is selected from calcium chloride, magnesium chloride, zinc chloride, and zinc sulfate.

8. The method of claim 1 wherein the greatest portion of the filler passes a #200 sieve.

9. The method of claim 1 wherein the filler is asbestos floats.

10. The method of claim 1 wherein the filler material is wetted with an aqueous solution containing N-tallow, N,N - dimethyl - N',N',N' - trimethyl 1,3 - propane diammonium dichloride in addition to the polyvalent metal salt, .05 to 1 part by weight of the diquaternary diammonium dichloride compound being employed per 100 parts by weight of the filler.

11. The method of claim 10 wherein from 0.1 to 0.3 part by weight of the diquaternary diammonium dichloride compound is employed per 100 parts by weight of the filler.

12. The method of preparing storage stable dispersions of negatively-charged fillers in aqueous cationic asphalt emulsions, comprising wetting the external negatively-charged surfaces of finely-divided filler material selected from the group consisting of asbestos, slate flour, talc, silica dust, limestone powder, mica, ground cork, rubber crumbles, wood flour, and coal dust of which at least 90 percent of the particles pass a #100 sieve and asbestos floats with an aqueous solution of a quaternary ammonium compound containing at least one quaternary ammonium group and an aliphatic hydrocarbon group of from 8 to 22 carbons, from .05 to 1 part by weight of said quaternary ammonium compound being employed per 100 parts by weight of said filler, and thereafter mixing the wetted filler material with a cationic asphalt emulsion having a continuous aqueous phase, a dispersed asphalt phase, and as a cationic emulsifier for the asphalt phase N-tallow, N,N-dimethyl-N',N',N'-trimethyl 1,3-propane diammonium dichloride, said filler comprising from about 5 to 70 weight percent of the final composition, thereby obtaining a composition of dispersed filler material in an aqueous cationic asphalt emulsion which is storage stable.

13. The method of claim 1 wherein said filler comprises from about 50 to 70 weight percent of the final composition.

References Cited
UNITED STATES PATENTS

| | | | |
|---|---|---|---|
| 2,760,878 | 8/1956 | Lhorty | 106—277 X |
| 2,775,530 | 12/1956 | Gagle et al. | 106—280 |
| 2,861,004 | 11/1958 | Sucetti | 106—277 |
| 3,000,750 | 9/1961 | Felletschin | 106—308 N |
| 3,014,810 | 12/1961 | Dybalski et al. | 106—308 N |
| 3,093,595 | 6/1963 | Levy et al. | 106—277 X |
| 3,220,593 | 11/1965 | Borgfeldt | 106—277 X |
| 3,236,671 | 2/1966 | Dybalski et al. | 106—277 |
| 3,359,738 | 12/1967 | Dybalski et al. | 106—277 X |
| 3,063,853 | 11/1962 | Sucetti | 106—277 X |
| 3,243,311 | 3/1966 | Rogers et al. | 106—280 |

FOREIGN PATENTS

| | | | |
|---|---|---|---|
| 645,098 | 7/1962 | Canada | 106—277 |
| 775,917 | 5/1957 | Great Britain | 106—277 |

JOAN B. EVANS, Primary Examiner

U.S. Cl. X.R.

94—20, 23; 106—282, 283, 308 B, 308 Q, 309, 287 SS; 117—168; 252—311.5; 260—28